United States Patent [19]

Smigerski et al.

[11] Patent Number: 4,883,829

[45] Date of Patent: Nov. 28, 1989

[54] PROCESS FOR PRODUCING POURABLE POWERED RUBBER CONTAINING FILLER

[75] Inventors: Hans-Juergen Smigerski, Marl; Uwe Ernst, Borken, both of Fed. Rep. of Germany

[73] Assignee: Hüls Aktiengesellschaft, Marl, Fed. Rep. of Germany

[21] Appl. No.: 184,785

[22] Filed: Apr. 22, 1988

[30] Foreign Application Priority Data

Jul. 14, 1987 [DE] Fed. Rep. of Germany ....... 3723214

[51] Int. Cl.$^4$ .......................... C08K 3/30; C08K 3/36; C08K 3/00
[52] U.S. Cl. .................................. 523/334; 524/447; 524/575; 524/575.5
[58] Field of Search ........................................ 523/334

[56] References Cited

U.S. PATENT DOCUMENTS

| | | | |
|---|---|---|---|
| 4,138,375 | 2/1979 | Berg et al. ............................ | 523/334 |
| 4,250,082 | 2/1981 | Sommer et al. ...................... | 523/334 |
| 4,582,539 | 4/1986 | Stacy ................................... | 523/334 |

*Primary Examiner*—John C. Bleutge
*Assistant Examiner*—David W. Woodword
*Attorney, Agent, or Firm*—Oblon, Spivak, McClelland, Maier & Neustadt

[57] ABSTRACT

Process for producing pourable powdered rubber with filler content independent of particle size. By adjusting to a pH in the range of 3.7 to 6.5 after the mixing of rubber latices or aqueous emulsions of rubber solutions with filler suspensions containing precipitant, and by using 0.1 to 2.0 phr of a selected metal salt, powdered rubbers can be produced with filler content independent of particle size.

17 Claims, No Drawings

PROCESS FOR PRODUCING POURABLE POWERED RUBBER CONTAINING FILLER

BACKGROUND OF THE INVENTION

1. Field of the Invention

The invention relates to the production of pourable powdered rubber. More specifically, the invention relates to a process for preparing pourable powdered rubber by mixing a rubber latex with a filler suspension containing a precipitant.

2. Discussion of the Background

The rubber industry has been increasingly concerned and interested in powdered rubbers and processes for producing the same. Present rubber technology uses primarily raw rubber material which is in the form of bales. Current rubber processing technology utilizing bale rubber requires a high cost in time, energy and personnel.

The mastication of the bale, and the intimate mixing with fillers, mineral oil plasticizers, and vulcanization accelerators are carried out on rolls or in kneaders. To avoid reductions in quality, the mixtures are prepared in several steps and the mixture is generally stored between steps. Extruder-pelletizers or extruder-roller dies generally follow the kneaders or rolls.

Only a completely new processing technology can lead the way out of this extremely unsatisfactory and costly technique of rubber processing. The use of pourable powdered rubber has been discussed and tested in recent years, because it provides the possibility for processing rubber mixtures simply and rapidly, like thermoplastic powders.

Several methods for producing powdered, pourable rubber-filler mixtures, especially rubber-carbon black mixtures based on general purpose rubbers, have already been found and described (see DE-PS 21 35 266 and PS 24 39 237; DE-AS 22 14 121; DE-OS 22 14 121; OS 23 25 550, OS 23 32 796, and OS 26 54 358). Important features of the processes described in these references are the use of special surface-active compounds and a costly, multistep precipitation technique.

Since the main objective of using powdered rubbers is to decrease costs in the area of rubber processing, a basic prerequisite for the success of these efforts is the economical production of rubbers in powdered form.

A process for producing powdered rubber is described and claimed in DE-PS 28 22 148. An important drawback to this process is the fact that not only are powders produced with particles of various sizes, but that they have a relatively high content of filler with decreasing particle size. This can result in problems during processing in the form of particle segregations. Segregation of particles results in variable filler contents in the molded parts prepared from the powdered rubbers.

SUMMARY OF INVENTION

Accordingly, one object of the present invention is to provide a process for preparing pourable powdered rubber with a filler content which is independent of particle size.

This and other objects of the present invention which will become apparent from the following specification have been achieved by the present process for producing a pourable powdered rubber which comprises (i) preparing an aqueous filler suspension by dispersing in water a filler, an acid and a water-soluble salt of a metal selected from groups IIa, IIb, IIIa or VIII of the periodic table, (ii) mixing the filler suspension with a rubber latex or an aqueous emulsion of a rubber solution to prepare a filler-containing rubber, wherein the pH of the mixture is in the range of 3.7 to 6.5; and (iii) isolating and drying the filler-containing rubber to produce the pourable rubber powder.

DETAILED DESCRIPTION OF THE PREFERRED EMBODIMENTS

Applicants have discovered a process for producing a pourable powdered rubber with a filler content which is independent of particle size. This condition is considered to be fulfilled when the deviation from the average is less than 3 parts per 100 parts by weight of rubber (phr) with filler ratios $\leq 100$ phr. The deviations are correspondingly higher with filler ratios $> 100$ phr, for example up to 6 phr with a filler ratio of 200 phr.

It was surprising to discover that the problems associated with known methods of preparing pourable rubbers could be avoided simply by adjusting the pH and the amount of metal salt in the aqueous filler suspension.

Suitable rubber latices are, on the one hand, those based on natural rubber and degraded natural rubber (British Patent 749 955 and German Patent Application P 36 06 745.8), and on the other hand, those based on homopolymers and copolymers of conjugated dienes such as those that can be prepared by known radical polymerization processes using an emulsifier (for example, see Houben-Weyl, Methods of Organic Chemistry, Volume XIV/1 (1961), "Preparation of Rubbers", pages 712 ff,; Ullmann's Encyclopedia of Industrial Chemistry, Volume 9 (1957), pp. 325–339, and DE-PS 679 587, PS 873 747, and PS 11 30 597). Useful conjugated dienes are 1,3-butadiene, isoprene, piperylene, 2-chloro-1,3-butadiene, 2,3-dichloro-1,3-butadiene, and 2,3-dimethyl-1,3-butadiene. The copolymers can be prepared either from mixtures of these conjugated dienes or from mixtures of these conjugated dienes with vinyl compounds such as styrene, alpha-methylstyrene, acrylonitrile, acrylic acid, methacrylic acid, and vinylpyridine. A styrenebutadiene latex with a styrene fraction of 15 to 30 wt. % is preferably used in the process of the invention. The solids content of the latices is generally 20 to 25 wt. %.

Rubber emulsions usable in the process of the present invention can be prepared from rubber solutions by known processes, for example those described in Houben-Weyl, Methods of Organic Chemistry, Volume I/2 (1961), "Emulsification, Emulsifiers", pp. 129 ff.

Suitable rubber solutions are preferably those that are formed by known processes of solvent polymerization of synthetic rubbers, for example polybutadienes, polyisoprenes, copolymers of butadiene and styrene, ethylene-propylene copolymers, ethylene-propylene-diene terpolymers, and polyalkenes that are formed by ring-opening polymerization of cyclic olefins.

It is well known that organometallic compounds can be used, such as Ziegler-Natta, lithium, or Alfin catalysts, for example, in the preparation of these rubbers depending on the monomers and the desired properties of the polymers.

Either aliphatic hydrocarbons such as pentane, hexane, heptane, or aromatic hydrocarbons such as benzene or toluene are generally used as solvents in the polymerization reactions. The rubber can also be brought into solution by dissolving in one of the mentioned solvents. The solids content of the rubber solutions is generally 3 to 35 wt. %. The solids content of the rubber emulsions prepared from the rubber solutions is generally 5 to 30 wt. %.

Powdered rubbers containing filler which contain not only a single rubber, but mixtures of two or more different rubbers, can also be produced by the process of the present invention.

Rubber latices, rubber solutions, or aqueous emulsions of rubber solutions are mixed for this purpose, and processed according to the invention to obtain powdered rubbers containing filler. Rubber latices are preferably used in the present process.

Suitable fillers are preferably the carbon blacks of all activity grades customary in the rubber industry, such as SAF, ISAF, or HAF carbon blacks including their modifications FEF, GPF, APF, SRF, and MT carbon blacks. However, inorganic substances can also be incorporated, such as high-activity silica, kaolin, and slate flour, for example. Combinations of carbon black with light-colored fillers are also possible.

The amount of filler to be used can be from 20 to 500 parts by weight per 100 parts by weight of rubber (phr), preferably 40 to 250 parts by weight of rubber.

The filler suspension is generally prepared by slurrying the filler or fillers in water and then dispersing them in a commercial emulsifying or dispersing apparatus until the individual filler particles have an average particle size diameter of approximately 10 $\mu$m (measured with a Leeds-Northrup laser diffraction spectrometer).

Metal salts that can be used are those of elements of Groups IIa, IIb, IIIa, and VIII of the Periodic Table. This group division corresponds to the former IUPAC recommendation (see Periodic System of the Elements, Verlag Chemie, Weinheim, 1985).

Non-limiting examples of suitable metal salts include magnesium chloride, barium sulfate, zinc sulfate, aluminum chloride, aluminum sulfate, ferric chloride, ferric sulfate, cobalt nitrate, and nickel sulfate with the salts of aluminum being preferred. Aluminum sulfate is especially preferred. The salts are used in an amount of 0.1 to 2 parts by weight per 100 parts by weight of rubber.

Acids suitable for adjusting to the specific pH are primarily mineral acids such as sulfuric acid, phosphoric acid, and hydrochloric acid. However, carboxylic acids such as formic acid and acetic acid can also be used. Sulfuric acid is the preferred acid.

The amount of acid is governed by the type and amount of the water-soluble metal salt, of the filler, of the rubber, and optionally of the alkali metal silicate. It can be readily determined by one skilled in the art by some preliminary experiments.

According to a preferred embodiment of the present process, up to 5 parts by weight of silica ($SiO_2$) per 100 parts by weight of rubber can also be used in the form of an alkali metal silicate solution, preferably as water glass, with a $Na_2O:SiO_2$ molar ratio of 2:1 to 1:4.

In general, the process of the present invention is carried out as follows: First, a filler suspension is prepared by dispersing the selected filler in water together with the metal salt, the acid, and optionally the alkali metal silicate solution. The total amount of water used is determined by the type of filler and the degree of solubilization. In general, the water-insoluble components of the filler amount to approximately 6 wt. %. This value does not represent an absolute limitation, however, and can be either higher or lower. The maximum content is limited by the pumpability of the suspension.

The filler suspension prepared in this way is then mixed intimately with the rubber latex or the aqueous emulsion of a rubber solution. Conventional mixing units such as propeller mixers are suitable for this mixing process.

A pH in the range of 3.7 to 6.5 and a selected amount of metal salt in the range of 0.1 to 2.0 phr are critical for the present process. The amount of acid and metal salt must be chosen so that the pH is in the 3.7-6.5 range at the end of the addition of the rubber component. It is preferable for the processing of precipitation suspensions with filler contents $\geq$100 phr to lower the pH to 2.5 before the phase separation. It is advisable to use an acid from the group of acids mentioned previously for this purpose.

The process of the present invention can be carried out either discontinuously or continuously. If the combination is carried out discontinuously, for example in a mixing vessel, the rubber component (a) must be added with stirring to the filler suspension (b) containing the precipitant (metal salt, acid, and optionally alkali metal silicate).

In case of continuous combination, e.g., in a pipe stream, the two streams (a) and (b) are mixed simultaneously.

When using rubber latices, a temperature of 15° C. to 60° C. is preferred during the precipitation process. When using rubber emulsions, it is preferred during the precipitation process to employ a temperature in the vicinity of the boiling point of the rubber solvent so that the solvent is distilled off.

Finally, the filler-containing rubber is separated from the water of the precipitation suspension by using conventional separating operations (phase separation), and is dried with constant agitation, for example, in a fluidized bed dryer. The particle size distribution of the powdered material obtained is generally less than 10 mm, preferably ranging from 50 microns to 5 mm, and especially preferably ranging from 100 microns to 3 mm.

Vulcanizable complete rubber mixtures can be prepared in a simple way from the filler-containing powdered rubbers produced by this invention by admixing with them the usual additives, such as additional fillers, plasticizer oils, resins, antioxidants and preservatives, as well as crosslinking agents in modern fluid mixers familiar from the technology of thermoplastics, without shear forces occurring. The direct use of such powdered complete rubber mixtures in the final stage of conventional rubber processing with the exclusion of heavy mechanical mixers with high energy consumption is possible in turn in a surprisingly simple and economical manner.

Furthermore, the powdered mixtures produced from the products of the present invention can be injected directly into special extruders or automatic injection molding machines. The output thereby obtainable and the quality of the resulting products, such as tire treads and extruded caulking, conform to the results when using solid rubbers in the conventional multistep, costly process techniques.

Other features of the invention will become apparent in the course of the following descriptions of exemplary embodiments which are given for illustration of the invention and are not intended to be limiting thereof.

EXAMPLES

If not otherwise indicated, percentage data are percentages by weight. The abbreviations, test methods, and measurement methods used in the application are summarized first:

1. Abbreviations phr: Parts by weight per 100 parts by weight of rubber
ML(1+4): Mooney viscosity, measured according to DIN 53 523

2. Test Procedures

Jenike Test for Flowability

The measured value specified in $N/m^2$ results from a shear test for determination of the yield pressure of powdered products by the Jenike method in the so-called Flow factor Tester (A. W. Jenike, Aufbereitungs-Technik 1982, No. 8, 411). The test was carried out with the specified consolidating pressure at 50° and with 24 hours of storage time. In the range in which yield pressure were chosen, the powders are considered to have good flowability and good bin storage capability with values below 1000 $N/m^2$. In the range from 1000 to 2000 $N/m^2$, the flowability of the powders is still satisfactory and they can still be handled in a silo with delivery aids. In case of values above 2000 $N/m^2$, the flowability and silo storage capability of the powders are unsatisfactory. A consolidating pressure of 3700 $N/m^2$ was chosen in all examples.

Test Screening Pursuant to DIN 16 165

The powdered rubbers obtained according to the examples were each divided into six fractions in the test screening. The screen meshes of fractions 1 to 6 were always 1000, 800, 500, 200, 100, and 50 μm, beginning with No. 1 having the screen mesh of 1000 μm.

Additional Determination

Determination of carbon black content was according to ASTM D 1506-59T. Determination of silica and other inorganic fillers was by ashing at 1000° C. and optional treatment with hydrofluoric acid (HF). pH determination was made using a Metrohm pH Meter (Model E 520).

EXAMPLE 1

1 Liter of completely deionized water was placed in a 5-liter plane ground glass flask. The carbon black suspension broken down with a Janke & Kunkel ULTRA-TURRAX dispersing apparatus, consisting of 940 g of water and 60 g of carbon black (Degussa CORAX N 339) was added to the flask with stirring together with 1.0 g of aluminum sulfate, 7.5 g of sodium water glass solution (solids content 26.5%, 1.4 g of $SiO_2$) and 2 g of sulfuric acid (calculated as 100%). After brief mixing at setting 8 (Janke & Kunkel RW 20 stirrer), 100 g of rubber (styrene-butadiene copolymer from Bunawerke Huls GmbH with ML(1+4)=50) was added as one portion as a 23.5% solids dispersion at the same stirring speed. The precipitation was completed within approximately 10 seconds after the addition of the rubber latex, after passing through the usual viscosity increase. The pH was 3.8. The mixer was stopped, and the precipitated product was separated from the liquid fraction on a filter and dried in a laboratory fluidized bed dryer to a residual water content of <1%.

Table 1 shows the results of the test screening and the carbon black determination.

TABLE 1

| Fraction No. | Screen Residue % | Carbon Black Content phr |
|---|---|---|
| 1 | 52.1 | 58 |
| 2 | 8.7 | 59 |
| 3 | 12.5 | 59 |
| 4 | 17.3 | 58 |
| 5 | 7.9 | 58 |
| 6 | 1.4 | 60 |

The yield pressure of the powdered rubber obtained was 1370 $N/m^2$.

COMPARISON EXAMPLE A

Example 1 was repeated except that 2.5 g of aluminum sulfate was used instead of 1.0 g of this metal salt. The pH of the precipitation suspension was 3.5. The yield pressure of the powdered rubber obtained was 2100 $N/m^2$. Table 2 shows the results of the test screening and the carbon black determination.

EXAMPLE 2

Example 1 was repeated except that no water glass was added to the carbon black suspension. The pH of the precipitation suspension was 4.0. The yield pressure of the powdered rubber obtained was 1620 $N/m^2$. Table 2 shows the results of the test screening and the carbon black determination.

TABLE 2

| Fraction No. | Screen Residue % Comparison Example A | Screen Residue % Example 2 | Carbon Black Content phr Comparison Example A | Carbon Black Content phr Example 2 |
|---|---|---|---|---|
| 1 | 41.2 | 86.5 | 53 | 58 |
| 2 | 9.2 | 8.3 | 57 | 59 |
| 3 | 21.3 | 5.0 | 60 | 61 |
| 4 | 18.8 | 0.2 | 62 | 60 |
| 5 | 8.8 | — | 72 | — |
| 6 | 1.1 | — | 75 | — |

EXAMPLE 3

Example 1 was repeated except that only 0.5 g of aluminum sulfate was used instead of 1.0 g. The pH of the precipitation suspension was 4.0. The yield pressure of the powdered rubber obtained was 1200 $N/m^2$. Table 3 shows the results of the test screening and of the carbon black determination.

EXAMPLE 4

The procedure was the same as in Example 1, but with the following differences: The filler suspension consisted of 1253 g of water and 80 g of carbon black (CORAX N 339); 1 g of barium sulfate was used as the metal salt. The pH of the precipitation suspension was 5.6. The yield pressure of the powdered rubber obtained was 1610 $N/m^2$. Table 3 shows the results of the test screening and of the carbon black determination.

TABLE 3

| Fraction No. | Screen Residue % Example 3 | Screen Residue % Example 4 | Carbon Black Content phr Example 3 | Carbon Black Content phr Example 4 |
|---|---|---|---|---|
| 1 | 62.1 | 69.3 | 59 | 79 |
| 2 | 7.6 | 9.5 | 59 | 80 |
| 3 | 10.8 | 15.3 | 59 | 81 |
| 4 | 13.5 | 5.8 | 58 | 81 |
| 5 | 4.8 | 0.1 | 59 | 80 |

TABLE 3-continued

| Fraction | Screen Residue % | | Carbon Black Content phr | |
| No. | Example 3 | Example 4 | Example 3 | Example 4 |
| --- | --- | --- | --- | --- |
| 6 | 0.7 | — | 60 | — |

EXAMPLE 5

The procedure was the same as in Example 1 but with the following differences: Only 1.95 g of aluminum sulfate was used as the metal salt, acetic acid (2 phr) was used to adjust the pH, and the filler suspension used was that of Example 4 (1253 g of $H_2O$ and 80 g of CORAX N 339). The pH of the precipitation suspension was 4.0. The yield pressure of the powdered rubber obtained was 1780 $N/m^2$. Table 4 shows the results of the test screening and of the carbon black determination.

EXAMPLE 6

The procedure was the same as described in Example 1, but with the following differences: The filler suspension consisted of 1253 g of water and 80 g of silica (Degussa VN 3), and 0.75 g of aluminum sulfate was used as the metal salt. The pH of the precipitation suspension was 3.8. The yield pressure of the powdered rubber obtained was 1720 $N/n^2$. Table 4 shows the results of the test screening and of the $SiO_2$ determination.

TABLE 4

| | Screen Residue % | | Filler Content phr | |
| Fraction No. | Example 5 | Example 6 | Example 5 | Example 6 |
| --- | --- | --- | --- | --- |
| 1 | 52.5 | 40.5 | 78 | 79 |
| 2 | 12.1 | 18.6 | 79 | 80 |
| 3 | 19.7 | 30.1 | 79 | 80 |
| 4 | 15.3 | 10.7 | 78 | 82 |
| 5 | 0.3 | 0.1 | 80 | 82 |
| 6 | 0.1 | — | 81 | — |

EXAMPLES 7 AND 8

Example 1 was repeated except that the filler suspension consisted of 3333 g of water and 200 g of carbon black (CORAX N 339). The pH of the precipitation suspensions were 4.5 in both cases. In Example 8, in contrast to Example 7, the pH was lowered to 2.5 before the phase separation. The yield pressure of the powdered rubbers obtained were 600 (Example 7) and 550 (Example 8) $N/m^2$. Table 5 shows the results of the test screenings and of the carbon black determinations.

TABLE 5

| Fraction | Screen Residue % | | Carbon Black Content phr | |
| No. | Example 7 | Example 8 | Example 7 | Example 8 |
| --- | --- | --- | --- | --- |
| 1 | 91.5 | 19.1 | 197 | 198 |
| 2 | 0.5 | 7.8 | 198 | 201 |
| 3 | 7.3 | 57.0 | 198 | 201 |
| 4 | 0.5 | 10.9 | 201 | 203 |
| 5 | 0.1 | 3.7 | 201 | 205 |
| 6 | 0.1 | 1.5 | 203 | 206 |

In each case, the ash content and residual water content was <1% in all of the examples.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for producing a pourable powdered rubber, comprising the steps of:
   (i) preparing an aqueous filler suspension by dispersing in water a filler, an acid, and a water-soluble salt of a metal selected from groups IIa, IIb, IIIa or VIII of the Periodic Table;
   (ii) mixing said filler suspension with a rubber latex or an aqueous emulsion of a rubber solution to prepare a filler-containing rubber, wherein the pH of the mixture is in the range of 3.8 to 6.5; and
   (iii) isolating and drying said filler-containing rubber to produce said pourable powdered rubber.

2. The process of claim 1, wherein an alkali metal silicate in addition to said filler is dispersed in said aqueous filler suspension.

3. The process of claim 2, wherein said alkali metal silicate is dispersed in amounts up to 5 phr of $SiO_2$.

4. The process of claim 1, wherein said water-soluble salt is selected from the group consisting of magnesium chloride, barium sulfate, zinc sulfate, aluminum chloride, aluminum sulfate, ferric chloride, ferric sulfate, cobalt nitrate, and nickel sulfate.

5. The process of claim 4, wherein said water-soluble salt is aluminum sulfate.

6. The process of claim 1, wherein said filler is selected from the group consisting of silica, kaolin, slate flower, carbon blacks, and mixtures thereof.

7. The process of claim 6, wherein said filler is dispersed in amounts from 20 to 500 phr.

8. The process of claim 7, wherein said filler is dispersed in amounts from 40 to 250 phr.

9. The process of claim 1, wherein said rubber solution comprises a solution of synthetic rubber in a hydrocarbon solvent.

10. The process of claim 9, wherein said hydrocarbon solvent is distilled from said mixture during said mixing step.

11. The process of claim 1, wherein said acid is a mineral acid.

12. The process of claim 11, wherein said mineral acid is sulfuric acid, phosphoric acid or hydrochloric acid.

13. The process of claim 1, wherein said acid is a carboxylic acid.

14. The process of claim 13, wherein said carboxylic acid is formic acid or acetic acid.

15. The process of claim 1, wherein said water-soluble salt is dispersed in an amount from 0.1-2 phr.

16. The process of claim 1, wherein the pH of said mixture is lowered to about 2.5 before said isolating step.

17. The process of claim 16, wherein the pH of said mixture is lowered to about 2.5 before said isolating step, for filler ratios greater than or equal to 100 phr.

* * * * *